(12) United States Patent
Hite, III (10) Patent No.: US 10,829,140 B1
(45) Date of Patent: Nov. 10, 2020

(54) FIREWOOD DELIVERY RACK SYSTEM AND METHOD

(71) Applicant: Milton Leroy Hite, III, Duluth, GA (US)

(72) Inventor: Milton Leroy Hite, III, Duluth, GA (US)

(*) Notice: Subject to any disclaimer, the term of this patent is extended or adjusted under 35 U.S.C. 154(b) by 0 days.

(21) Appl. No.: 16/540,171

(22) Filed: Aug. 14, 2019

Related U.S. Application Data (60) Provisional application No. 62/764,763, filed on Aug. 16, 2018.

(51) Int. Cl.
| | | |
|---|---|---|
| *A47B 47/00* | (2006.01) | |
| *A47F 7/00* | (2006.01) | |
| *B62B 5/02* | (2006.01) | |
| *F24B 15/00* | (2006.01) | |
| *B62B 1/10* | (2006.01) | |
| *A47B 47/04* | (2006.01) | |
| *A47B 55/00* | (2006.01) | |
| *A47B 47/02* | (2006.01) | |
| *A47F 5/10* | (2006.01) | |

(52) U.S. Cl.
CPC .......... *B62B 5/02* (2013.01); *A47B 47/0058* (2013.01); *A47B 47/0083* (2013.01); *A47B 47/027* (2013.01); *A47B 47/045* (2013.01); *A47B 55/00* (2013.01); *A47F 5/108* (2013.01); *A47F 7/0035* (2013.01); *B62B 1/10* (2013.01); *F24B 15/00* (2013.01)

(58) Field of Classification Search
CPC ... B62B 5/02; B62B 1/10; F24B 15/00; A47B 47/04; A47B 47/045; A47B 61/006; A47B 47/0058; A47B 47/02; A47B 47/021; A47B 47/028; A47B 81/00; A47B 55/00; A47B 47/0083; A47B 81/007; A47B 47/027; A47F 7/0021; A47F 7/0007; A47F 7/0014; A47F 7/0035; A47F 7/00; A47F 5/108; A47F 5/10; A47F 7/30; A47G 5/00; A47G 5/04; A47G 25/54
USPC ............. 211/180, 60.1, 49.1, 191, 27, 85.18, 211/85.22; 312/257.1, 265.1; D23/410; 248/188.2, 188.4, 188.3
See application file for complete search history.

(56) References Cited

U.S. PATENT DOCUMENTS

| | | | | |
|---|---|---|---|---|
| 564,382 | A * | 7/1896 | Larson .................... | F24B 15/04 126/283 |
| 732,037 | A * | 6/1903 | Best ....................... | A47G 23/06 294/167 |
| 1,793,637 | A * | 2/1931 | Rockwell ................. | B62B 1/12 280/47.26 |
| 2,782,047 | A * | 2/1957 | Moran ..................... | B62B 1/12 280/654 |
| 2,896,961 | A * | 7/1959 | Low ........................ | F24B 15/00 280/47.26 |
| 2,962,170 | A * | 11/1960 | Best ...................... | A47B 47/027 211/182 |

(Continued)

*Primary Examiner* — Jennifer E. Novosad
(74) *Attorney, Agent, or Firm* — Ronald J. Koch; The Eley Law Firm (57) ABSTRACT

A firewood delivery and storage system wherein a rack is loaded with firewood at a first origin position. The rack is placed on a wheeled dolly and then transported to a second storage and use position. The rack is then removed from the wheeled dolly. Thereafter, the customer can access the firewood, or move the firewood rack with a dolly or hand truck to a desired location.

1 Claim, 7 Drawing Sheets

(56) References Cited

U.S. PATENT DOCUMENTS

| | | | | |
|---|---|---|---|---|
| 3,021,011 A * | 2/1962 | Visneski | B62B 3/04 | 211/49.1 |
| 3,095,886 A * | 7/1963 | Frommelt | B61D 39/00 | 135/123 |
| 3,187,901 A * | 6/1965 | Wilson | F24B 15/00 | 211/49.1 |
| 3,218,090 A * | 11/1965 | Herman | B65F 1/06 | 280/47.26 |
| 3,255,905 A * | 6/1966 | Cochran | B62B 1/147 | 414/446 |
| 3,527,359 A * | 9/1970 | Ambertson | A47B 88/43 | 211/71.01 |
| 3,861,695 A * | 1/1975 | Shourek | B62B 1/125 | 280/5.24 |
| 4,236,775 A * | 12/1980 | Haynes | F24B 1/199 | 312/351 |
| 4,264,081 A * | 4/1981 | Markham | F24B 15/00 | 211/49.1 |
| 4,333,574 A * | 6/1982 | Christy, Sr. | E04H 1/1205 | 211/49.1 |
| 4,349,213 A * | 9/1982 | Hirsch | B62B 1/00 | 126/283 |
| D267,359 S * | 12/1982 | Mustard | D34/26 | |
| D289,080 S * | 3/1987 | Einsel | D23/410 | |
| D296,504 S * | 7/1988 | Bell | D6/675.5 | |
| 4,765,491 A * | 8/1988 | Mueller | F24B 15/00 | 211/182 |
| 4,823,965 A * | 4/1989 | Hughes | F24B 1/199 | 211/60.1 |
| D311,060 S * | 10/1990 | Green | D23/410 | |
| D316,340 S * | 4/1991 | Richardson | D23/410 | |
| 5,028,062 A * | 7/1991 | Pinnell | B62B 3/02 | 280/2 |
| 5,205,421 A * | 4/1993 | Bustos | A47F 5/005 | 108/108 |
| 5,280,933 A * | 1/1994 | Finneyfrock | F24B 15/00 | 211/49.1 |
| 5,385,247 A * | 1/1995 | Owens | E04H 1/1205 | 211/49.1 |
| D357,827 S * | 5/1995 | Schultz | D23/410 | |
| D364,920 S * | 12/1995 | Amborski | D23/410 | |
| 5,484,150 A * | 1/1996 | Yasutomi | B60B 33/0002 | 211/182 |
| 5,651,467 A * | 7/1997 | Moran, III | A47B 45/00 | 211/189 |
| 5,743,413 A * | 4/1998 | Noll | A47B 45/00 | 211/175 |
| 5,941,398 A * | 8/1999 | Harris | F24B 15/00 | 211/195 |
| 6,022,032 A * | 2/2000 | Savage | B62B 1/20 | 280/47.24 |
| 6,036,032 A * | 3/2000 | Moscatelli | F24B 15/00 | 211/60.1 |
| 6,206,385 B1 * | 3/2001 | Kern | B62B 3/02 | 280/47.35 |
| 6,290,073 B1 * | 9/2001 | Barnes, Sr. | F24B 15/00 | 211/175 |
| 6,644,484 B1 * | 11/2003 | Sardis | A47B 43/00 | 211/189 |
| 6,742,792 B1 * | 6/2004 | Hooper | B62B 1/008 | 150/154 |
| 6,997,332 B1 * | 2/2006 | Alexander | A47B 47/027 | 211/182 |
| 8,162,349 B1 * | 4/2012 | Roselle | B62B 1/008 | 280/639 |
| 8,528,754 B2 * | 9/2013 | Noniewicz | B27B 21/00 | 211/195 |
| D713,520 S * | 9/2014 | Alexander | D23/410 | |
| 8,973,767 B1 * | 3/2015 | Stearns | A47B 81/00 | 211/134 |
| D767,753 S * | 9/2016 | Edmund | D23/407 | |
| 10,414,421 B1 * | 9/2019 | Westmoreland | B62B 3/10 | |
| 2005/0098693 A1 * | 5/2005 | Holt | F24C 15/086 | 248/188.2 |
| 2006/0091269 A1 * | 5/2006 | Hanson | F16M 7/00 | 248/188.4 |
| 2007/0216120 A1 * | 9/2007 | Bothun | A47F 5/108 | 280/79.11 |
| 2008/0290053 A1 * | 11/2008 | Carnright | F24B 1/199 | 211/49.1 |
| 2009/0001033 A1 * | 1/2009 | Sung | A47B 43/04 | 211/85.3 |
| 2016/0264291 A1 * | 9/2016 | Hansen | B65D 19/40 | |
| 2017/0057531 A1 * | 3/2017 | Nowe | B62B 3/006 | |
| 2018/0079440 A1 * | 3/2018 | Muscocea | A45C 13/262 | |

* cited by examiner

FIREWOOD DELIVERY RACK SYSTEM AND METHOD

FIELD

The invention relates generally to firewood storage systems and more particularly to systems and methods of firewood storage and delivery.

BACKGROUND AND SUMMARY

Firewood delivery offers the consumer a convenient and easy way to get firewood for their individual needs while avoiding the rigor of manually chopping, collecting, etc. One large shortcoming has always been getting the firewood from the delivery point, which is typically the front yard or street, to the location where it is stored. Moving the firewood from the delivery point to the point of storage and/or use involves additional labor (and cost). For example, a firewood delivery is accomplished by a delivery person placing the firewood in a customer's front yard. The wood must then be moved by the customer to the backyard for storage. The customer desires to avoid the added expense of paying the delivery service to deliver and stack the wood at the final location, leaving the customer to expend considerable time and effort to accomplish this tedious task.

Additionally, firewood has heretofore been delivered in configurations that are suitable for shipping, but are not suitable for storage. In other words, the individual logs of a firewood delivery must be re-stacked or otherwise arranged. Therefore, there would be a great reduction in time and labor benefiting both the consumer and firewood provider or delivery service if the delivery configuration were suitable for delivery and storage.

The foregoing examples expose an unmet need for a suitable apparatus, system, and/or method that overcomes the foregoing problems, as well as other problems that will be appreciated by the skilled person (aka "person of ordinary skill in the art"), and facilitates the transport, delivery, and storage of firewood or similar material. The skilled person, after having studied the subject technology, may appreciate other objects and advantages as well.

In one aspect, the subject technology comprises a combined delivery and storage rack that is easily transported by the consumer or a delivery service. In one aspect, a firewood delivery dolly/rack combination allows the consumer to move the firewood all at once without having to restack the wood. By combining the dolly and rack, a system and method is provided wherein the customer no longer has to move the wood piece by piece. A more efficient system and method is presented comprising a configuration suitable for shipment, delivery to a first point, and relocation to a second point for storage.

In one aspect, a quantity of wood is pre-measured and packed into a rack at the origin. The rack is then delivered to the destination where it is thereafter easily relocated to a second position using a dolly. The wood is packed into the rack so as to facilitate being easily removed, piece by piece, by the customer as the wood is moved to the fireplace or other final destination.

In one aspect, subsequent deliveries comprise collecting an empty rack that is transported back to the origin for reuse. The firewood delivery rack is simply interchanged, replacing the full rack for an empty one.

In some aspects, the base of the rack (e.g. third support member 16) may be fitted with a pair of wheels. The wheels may be independently attached to each side of the base or may be affixed to a cross member axle affixed to the base. This configuration can be extended to having a pair of wheels on each side such that there are four wheels total, each independently attached, or alternatively each pair of wheels attached to opposite side of first and second axles, each of which being attached to opposite sides of the rack.

In some aspects, a two wheeled dolly is used. In other aspects, a wheeled dolly having stair climbing capability is used.

The rack can be designed as a welded unit, or alternatively the rack can be assembled in sections that are releasably connected, thereby allowing for assembly and disassembly, for ease of storage or shipment.

The rack may be constructed of wood, either disposable or for reuse. Regarding the former, such wood can be used as firewood. Additionally, the rack may be constructed from a tubular or angled metal, plastic, or other material having sufficient strength and rigidity suited for the intended purposes as described herein.

BRIEF DESCRIPTION OF THE DRAWINGS

FIG. 1A Depicts a side view of a rack in one aspect of the subject technology FIG. 1B Depicts a front view of a rack in one aspect of the subject technology FIG. 2 Depicts a front perspective view of a rack in one aspect of the subject technology FIG. 3 Depicts a side view of a rack in one aspect of the subject technology FIG. 4 Depicts a side view of a rack in one aspect of the subject technology FIG. 5 Depicts a perspective view of a wheeled dolly in one aspect of the subject technology FIG. 6 Depicts a side representative view of a wheeled dolly in one aspect of the subject technology FIG. 7 Depicts a front perspective view of a rack in one aspect of the subject technology having a rain guard 50

REFERENCE NUMERALS IN DRAWINGS

The table below lists the reference numerals employed in the figures, and identifies the element designated by each numeral.

2 support cross member 2
10 rack 10
12 first support member 12
13 bottom portion 13 of first support member 12
14 second support member 14
15 bottom portion 15 of second support member 14
16 third support member (aka base) 16
17 upper portion 17 of first support member 12
18 upper portion 18 of second support member 14
20 fourth support member 20
22 fifth support member 22
24 a quantity of wood 24
26 wheels 26
28 axle 28
30 individual piece of wood 30
32 first end 32 of individual piece of wood 30
34 second end 34 of individual piece of wood 30
36 dolly 36
38 dolly configured to traverse one or more stairs 38
40 first and second primary wheels 40 of dolly 38
42 first and second secondary wheels 42 of dolly 38
44 stairs 44
46 power assist mechanism 46 of dolly 38

48 adjustable support feet 48
50 rain guard 50
52 top portion 52 of rack

DETAILED DESCRIPTION

In one aspect of the subject technology, a rack 10 comprises first and second support members 12, 14, and a plurality of support cross members 2. The first and second support members 12, 14, each comprise a vertically oriented rectangular frame. A bottom portion 13, 15 of each of the first and second support members 12, 14, respectively, are connected to a plurality of support cross members 2 fastened perpendicularly between them, by welding, bolting, screwing, or other methods having sufficient strength and rigidity characteristics. The first and second support members 12, 14 are held in a parallel orientation a selected distance apart by the support cross members 2.

In another aspect of the subject technology, the support cross members 2 are replaced by a third support member 16. A bottom portion 13, 15 of each of the first and second support members 12, 14, respectively, are connected to the third support member 16. The third support member 16 comprises a horizontally oriented rectangular frame having similar functionality to the plurality of support cross members 2. In either aspect, the plurality of support cross members 2 and the third support member 16 are adapted to contact a horizontal flat surface (e.g. a floor), so as to allow the rack to support a quantity of wood 24 (e.g. FIG. 2). It is to be understood that the plurality of support cross members 2 and the third support member 16 have similar functionality, and that various other aspects (e.g. wheels 26, adjustable support feet 48) may be used with either or both of the third support member 16 or support cross members 2.

Figure 2:
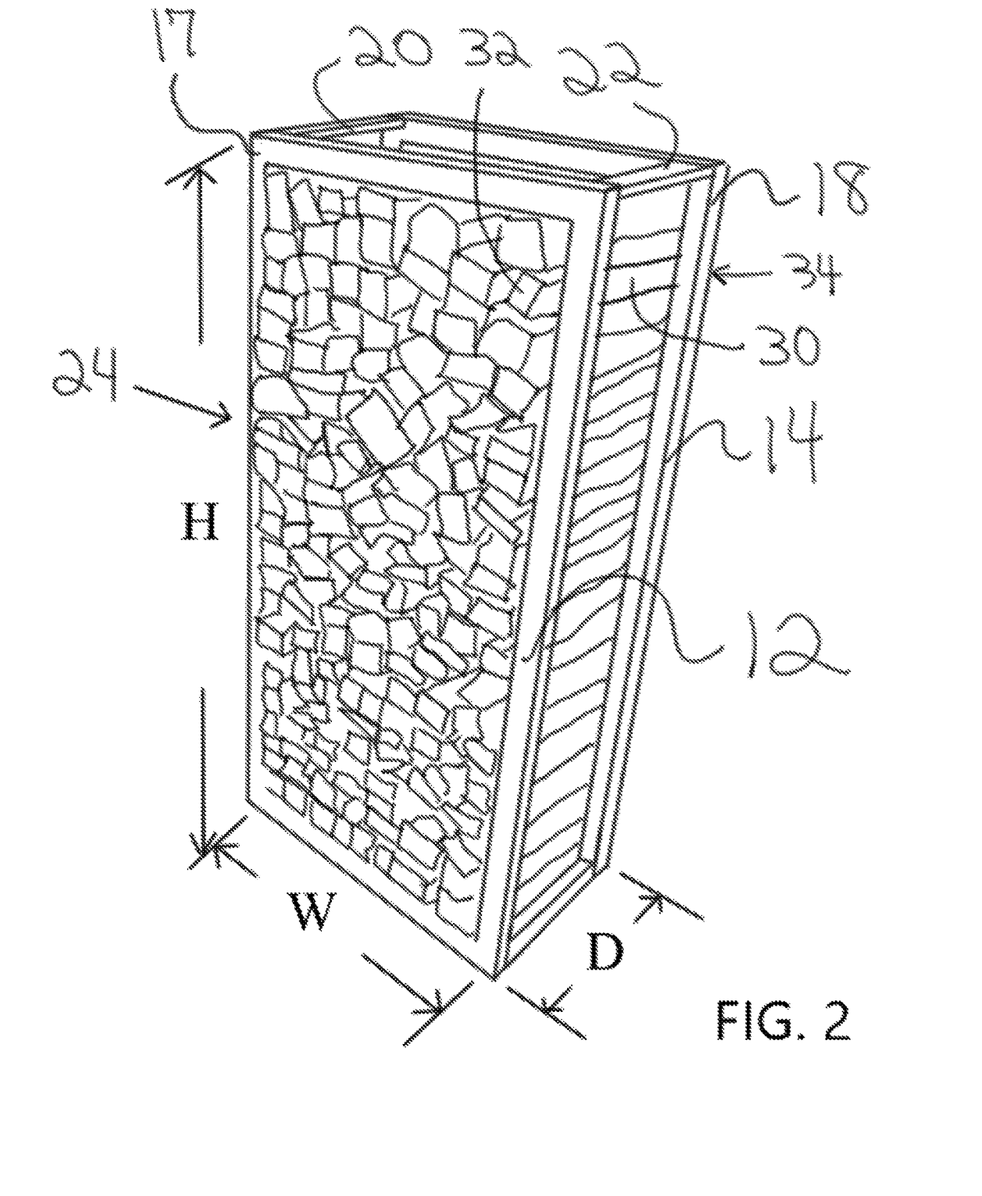

In one aspect, each of the first, second, and third support members 12, 14, & 16 comprise a rectangular frame being formed from tubular metal stock having rectangular cross section. In one aspect, the stock is welded to form the frame. As shown in FIG. 2, the height "H" (vertical direction) of each of the first and second support members 12, 14 is relatively larger than the width "W" (horizontal direction). In one aspect, first and second support members 12, 14 are arranged substantially parallel to each other.

Figures 1A, 1B:
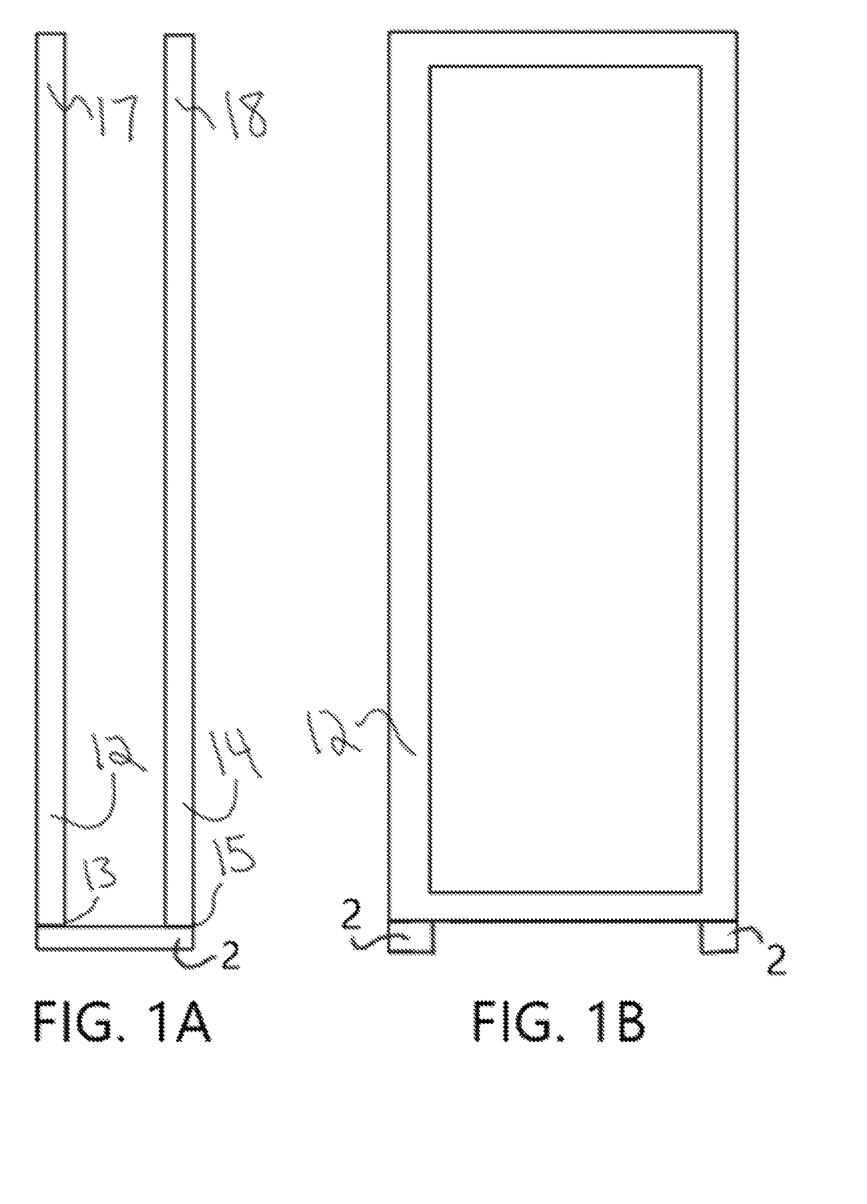

As shown in FIG. 1A, an upper portion 17, 18 of each of the first and second support members 12, 14 are free-floating in one aspect in that they are not connected to anything. Another aspect is shown in FIG. 2 wherein fourth and fifth support members 20, 22 are attached to upper portions 17, 18 of first and second support members 12, 14 for added stability. Such further stabilization of upper portions 17, 18 can be accomplished various ways. For example, fourth and fifth support members 20, 22 can be welded to upper portions 17, 18 or alternatively secured with removable fasteners such as bolts or screws. Alternatively, a frame or bracket can be permanently or releasably affixed to upper portions 17 and 18.

Those of skill in the art will appreciate that the support cross members 2, & first, second, and third support members, 12, 14, & 16, respectively, can be made of metal or other sufficiently strong materials, including wood (e.g. 2×4 lumber), plastic lumber, or other materials having sufficient strength and rigidity to hold firewood during transport and storage.

Figure 3:
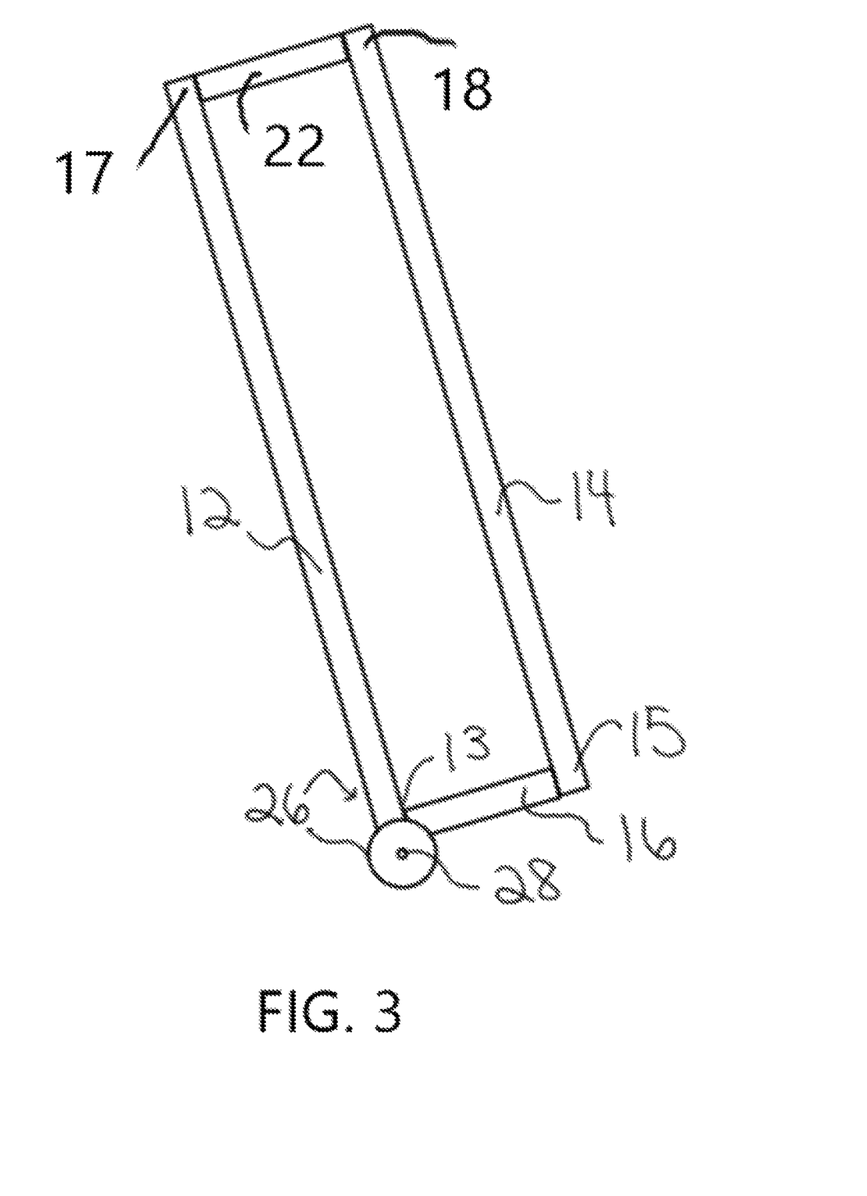

Wheels can be connected, either permanently or releasably, to the third support member 16, support cross members 2, and/or the bottom portions 13, 15 of the first and second support members 12, 14, respectively. In one aspect, first and second wheels 26 are attached to opposing sides of the third support member 16, proximate one of the first or second support members 12, 14. As shown in FIG. 3, first and second wheels 26 are attached to opposing sides of the third support member 16. In one aspect, this is accomplished by attaching the wheels to opposing sides of an axle 28, the axle being operatively connected to the third support member 16. FIG. 3 is a side view and thus only one wheel is shown, but it is to be understood that there are two such wheels, one of which is not visible in the side view.

As depicted in FIG. 3, first and second wheels 26 are attached proximate first support member 12. In another aspect, first and second wheels 26 are attached proximate second support member 14. It should be understood that both wheels are attached proximate one or the other of the first or second support members 12, 14 to facilitate tipping the rack such that it is supported by the wheels. However, in another aspect (not shown) four wheels are employed, two on each side, such that two wheels are attached to both first and second support members 12, 14. As shown in FIG. 3, wheels 26 are attached to opposing sides of first support member 12.

The rack shown in FIG. 1A can be modified to add structural support by adding fourth and fifth support members 20, 22, each having opposing ends, as shown in FIG. 2 wherein fourth and fifth support members 20, 22 are shown attached to opposite sides of the first and second support members 12, 14 proximate upper portions 17, 18 thereof. In one aspect, the fourth and fifth support members are releasably attached. In another aspect, the fourth and fifth support members are permanently attached.

It should be understood that the rack as described in various aspects herein can be fabricated in various ways. For example, considering that each of the first support member 12, second support member 14, and third support member 16, each comprise rectangular frames formed from four structural components in one aspect, such structural components could be used to create rectangular side frames (not shown) such that fourth support member 20 is included in one side frame, and fifth support member 22 is included in an opposing side frame. The skilled person will appreciate that the rack shown in FIG. 2 could be constructed in such a way.

Figure 4:
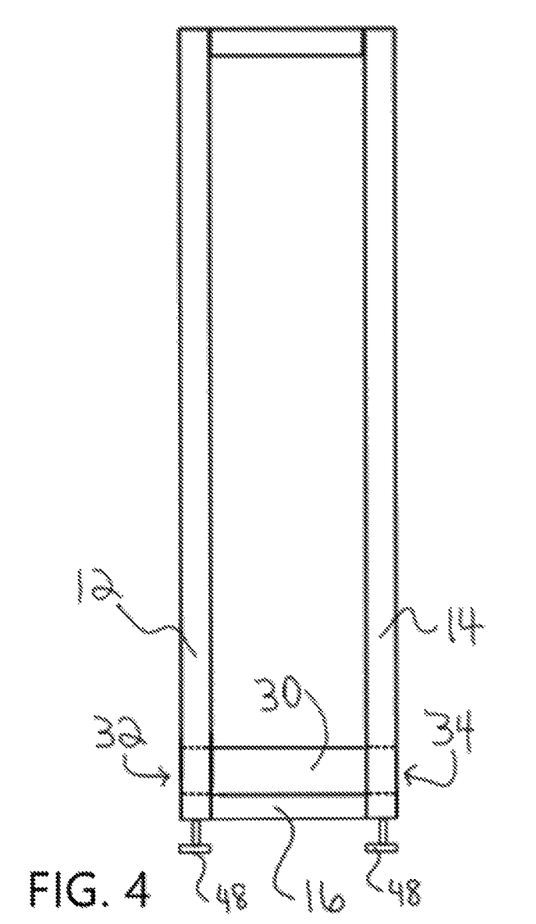

Adjustable support feet can be connected, either permanently or releasably, to the third support member 16, support cross members 2, and/or the bottom portions 13, 15 of the first and second support members 12, 14, respectively. In one aspect, four adjustable support feet 48 attached to a bottom portion of the third support member 16. FIG. 4 depicts the support feet 48. FIG. 4 is a side view and thus only two support feet are shown, but it is to be understood that there are four such feet, two of which are not visible in the side view. In one aspect, there are four such feet, each being attached proximate a corner of the third support member 16. The skilled person will appreciate that the location or placement of such feet can be adjusted to suit differing surface topographies and load characteristics.

Figure 7:
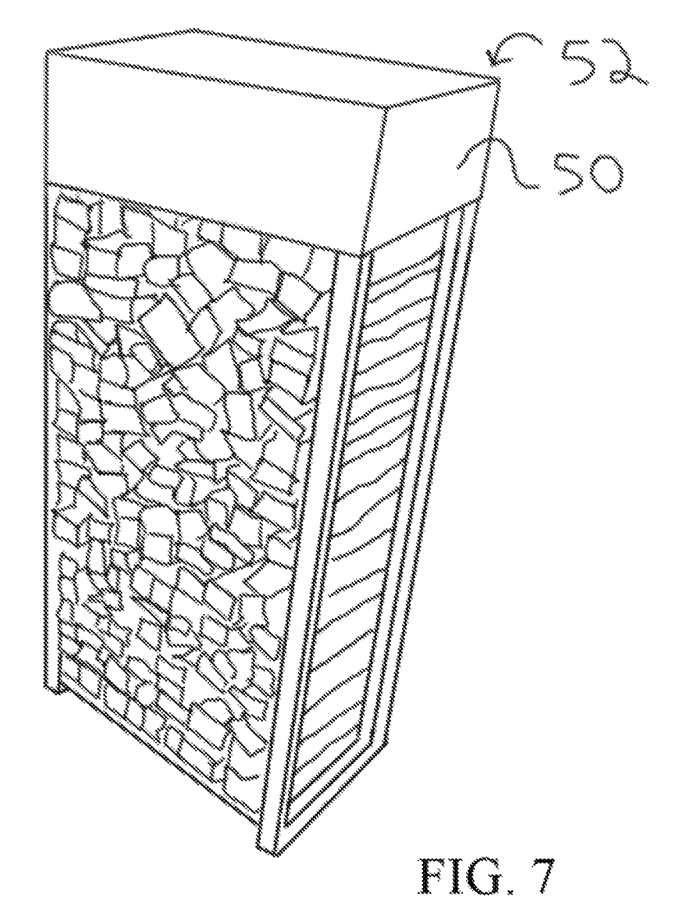

In one aspect (FIG. 7), a fabric rain guard 50 is removably attachable to a top portion 52 of the rack.

As depicted in FIG. 2, a quantity of wood 24 is arranged in a rack. Said quantity of wood comprises a plurality of individual pieces of wood 30, each said individual piece of wood being elongate and having opposing first and second ends 32, 34.

The quantity of wood 24 is arranged in the rack by sizing and placing each individual piece of wood in the rack such that the first and second opposing ends 32, 34 are disposed proximate the first and second support members 12, 14. In one aspect, the quantity of wood and rack are shrink wrapped.

As shown in FIG. 4, a piece of wood 30 is sized and arranged in one aspect such that it approximately spans the depth "D" (FIG. 2) of the third support member 16 (or support cross member 2 in another aspect) such that opposing ends 32, 34 are each at least partially supported by lower portions 13, 15 of the first and second support members 12, 14, respectively. It is to be understood that the size (length) of the wood is chosen commensurate with the depth "D" of the rack, or vice versa.

In one aspect, third support member 16 comprises a rectangular frame, and in this configuration it is important that opposing ends of each piece of wood are at least partially supported because otherwise said piece of wood might fall through the middle of the frame comprised of third support member 16. However, in another aspect, third support member 16 is not a rectangular frame per se, but rather comprises a solid piece of material with sufficient strength and rigidity. Thus, a piece of wood could not fall through an opening in the bottom of the rack.

Figure 5:
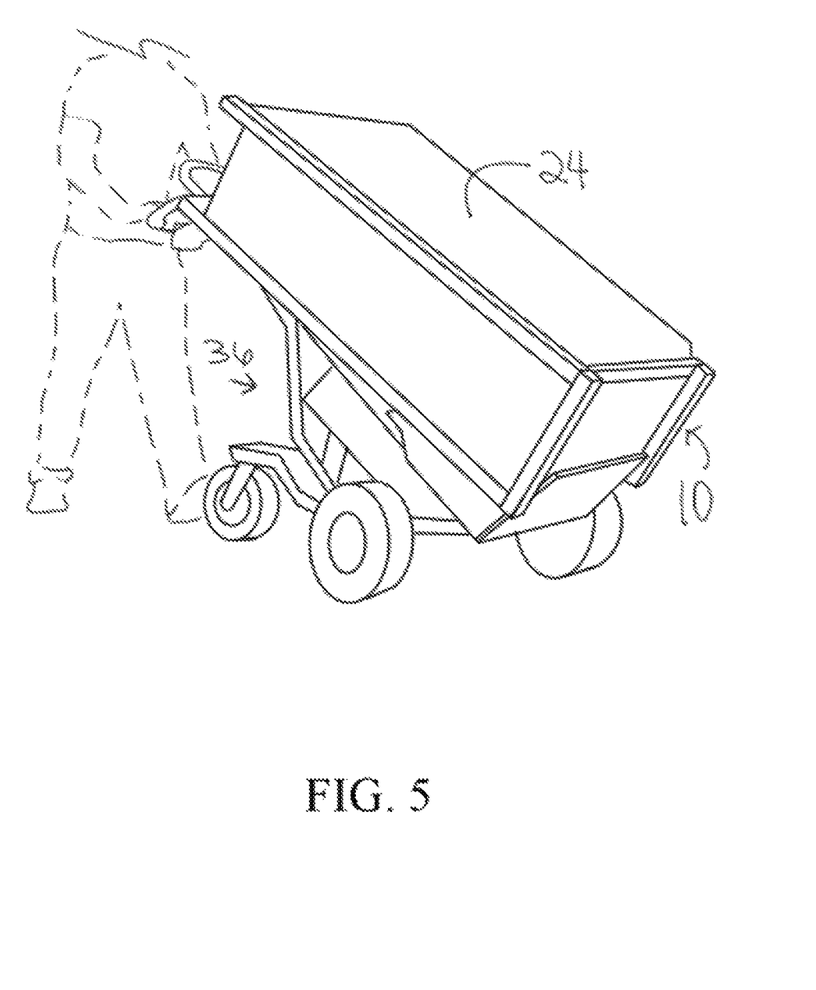
Figure 6:
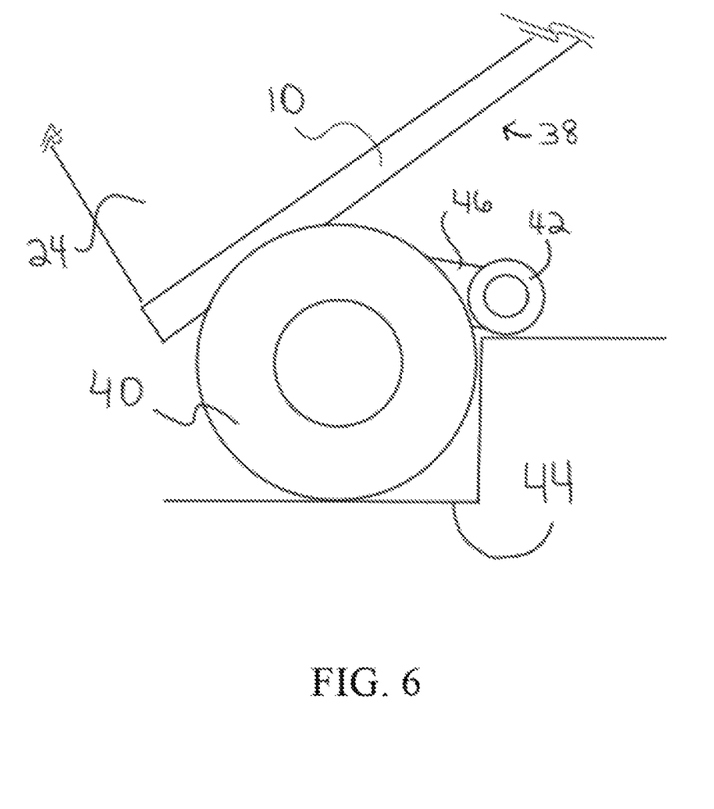

In one aspect (FIG. 5), the rack (with quantity of wood 24 arranged therein) is placed on a dolly (e.g. dolly 36 with wheels as shown in FIG. 5) for transport. In one aspect, the wheeled dolly is configured to traverse one or more stairs. As shown in FIG. 6, dolly 38 has first and second primary wheels 40, and first and second secondary wheels 42, only one of which are shown in side view. First and second secondary wheels 42 are configured to engage an upper stair such that primary wheels 40 can be lifted to said upper stair. In one aspect, a power assist mechanism 46 is employed to facilitate such lifting.

It should be understood that the height "H", width "W", and depth "D" (FIG. 2) can be adjusted to size various quantities of wood, and wood of differing cross section and length. In one aspect, the general dimensions are approximately two feet wide ("W") by four feet tall ("H") by sixteen inches deep ("D"). In another aspect, the general dimensions are approximately two feet wide ("W") by four feet tall ("H") by eighteen inches deep ("D").

The invention is in no way limited to the specifics of any particular embodiments and examples disclosed herein. For example, the terms "aspect," "example," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:

1. A method for delivery and storage of firewood comprising the steps of:
   a. obtaining a combined delivery and storage rack comprising first and second support members (12, 14), each comprising a vertically oriented rectangular frame; a bottom portion (13, 15) of each of the first and second support members (12, 14), respectively, being connected to a plurality of support cross members (2) fastened perpendicularly between them; whereby the first and second support members (12, 14) are held in a parallel orientation a selected distance apart by the support cross members;
   b. obtaining a quantity of firewood (24), said quantity of firewood comprising a plurality of individual pieces of firewood (30), each said individual piece of firewood being elongate and having opposing first and second ends (32, 34);
   c. arranging by stacking the quantity of firewood (24) in the combined delivery and storage rack at a first origin position by sizing and placing each individual piece of wood in the combined delivery and storage rack such that the first and second opposing ends (32, 34) are disposed proximate the first and second support members (12, 14);
      whereby each said individual piece of firewood approximately spans the plurality of support cross members (2) such that the first and second ends (32, 34) are at least partially supported by the first and second support members (12, 14);
   d. arranging the combined delivery and storage rack on a wheeled dolly, whereby the combined delivery and storage rack and the quantity of wood together can be delivered to a second storage and use position whereby the combined delivery and storage rack is removed from the wheeled dolly, without a consumer having to restack the firewood within the combined delivery and storage rack before use.

\* \* \* \* \*